(12) United States Patent
Rus et al.

(10) Patent No.: US 9,141,651 B1
(45) Date of Patent: Sep. 22, 2015

(54) ADAPTIVE COLUMN SET COMPOSITION

(75) Inventors: Silvius V. Rus, Orinda, CA (US);
Thileepan Subramaniam, Mountain View, CA (US)

(73) Assignee: Quantcast Corporation, San Francisco, CA (US)

( * ) Notice: Subject to any disclaimer, the term of this patent is extended or adjusted under 35 U.S.C. 154(b) by 472 days.

(21) Appl. No.: 13/563,293

(22) Filed: Jul. 31, 2012

(51) Int. Cl.
*G06F 17/30* (2006.01)
(52) U.S. Cl.
CPC .................. *G06F 17/30292* (2013.01)
(58) Field of Classification Search
None
See application file for complete search history.

(56) References Cited

U.S. PATENT DOCUMENTS

| | | | | |
|---|---|---|---|---|
| 5,926,816 | A * | 7/1999 | Bauer et al. | 1/1 |
| 2006/0253473 | A1 * | 11/2006 | Agrawal et al. | 707/100 |
| 2007/0143557 | A1 * | 6/2007 | Uppala | 711/165 |
| 2011/0173164 | A1 * | 7/2011 | Bendel et al. | 707/693 |

* cited by examiner

*Primary Examiner* — Robert Beausoliel, Jr.
*Assistant Examiner* — Susan F Rayyan
(74) *Attorney, Agent, or Firm* — Fenwick & West LLP; Robin E. Reasoner; Renee Jacowitz

(57) ABSTRACT

A column set server adapts to data use patterns by data consumers by modifying how a table produced by a data producer is partitioned into separate column sets to reduce the waste incurred in accessing the data by multiple consumers of the data. For example, the column set server adjusts a column set distribution when a new consumer process is added, when one is retired, or when relative data set size ratios change.

15 Claims, 3 Drawing Sheets

ADAPTIVE COLUMN SET COMPOSITION

BACKGROUND

1. Technical Field

This invention pertains in general to data processing, and in particular to the separation of large amounts of data into smaller partitions to improve throughput and/or speed in subsequent analysis.

2. Description of Related Art

For processing purposes, data is often organized into tables having rows and columns. An individual entry in a table at the intersection of a row and column is referred to as a field. Once a table is produced, a consumer process may access selected rows of the table, but may not need to access all fields in the selected rows. However, the consumer process reads all data in the selected rows at least once, including fields that are not needed. These unneeded fields are then discarded. Reading unneeded fields and then discarding them is wasteful in terms of processing time and resources.

Some developers have attempted to reduce the waste involved in reading and discarding unneeded fields by altering the design of the data tables to more closely follow how the data tables will be used. This requires the developer to decide how to split up columns of the data into sets so that consumer processes read less unneeded fields. Conventionally, these are decisions made by developers when they establish the design of the data tables. However, if a new consumer is added to the mix, or if one is retired, or if the access pattern to the data changes in other ways, the system suffers from the inefficiency. In some cases, the developer may be able to manually redesign the layout of the data tables which requires reshuffling the data and potentially requires changes to the software infrastructure.

SUMMARY

Embodiments of the invention provide adaptive column set composition that relieves a developer from the burden of designing an efficient column set composition for data tables and removes the burden from the developer of redesigning an efficient column set composition when a change in access patterns to the data occurs. Embodiments of the invention adapt to data use patterns by modifying how a table is partitioned into separate column sets to reduce the waste incurred in accessing the data by multiple consumers of the data. For example, the system adjusts a column set distribution when a new consumer process is added, when one is retired, or when relative data set size ratios change.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
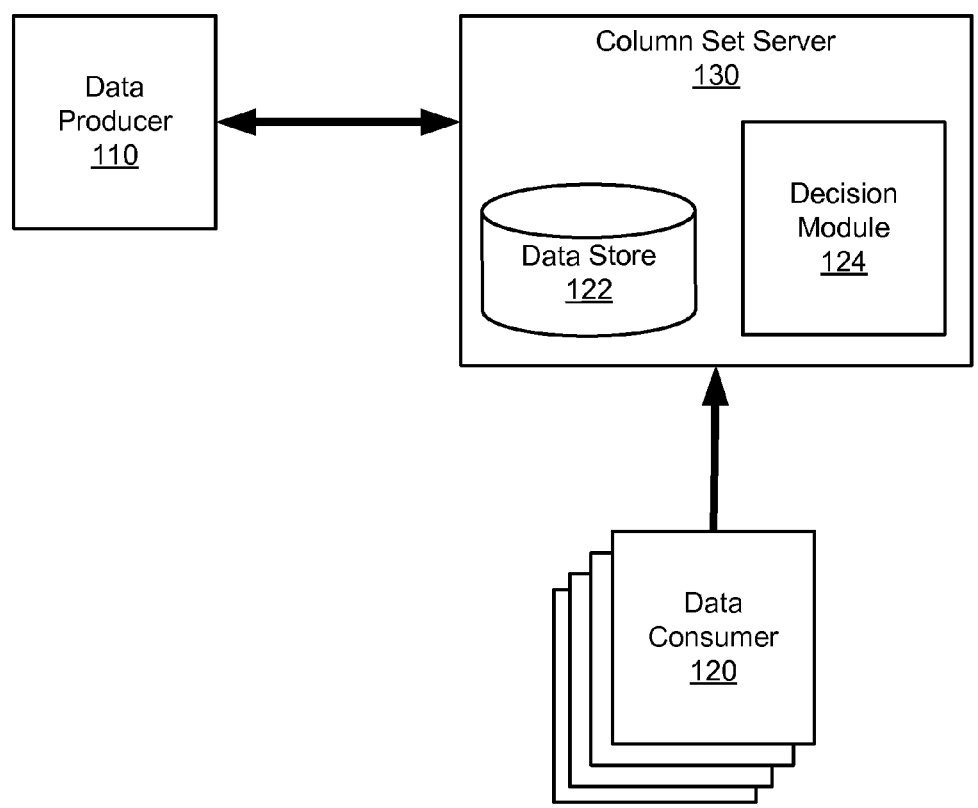
FIG. 1 is a high-level block diagram of a computing environment for performing adaptive column set composition, in accordance with an embodiment of the invention.

Embodiments of the invention adapt to data use patterns by modifying how a table is partitioned into separate column sets to reduce the waste incurred in accessing the data by multiple consumers of the data. Figure (FIG. 1 is a high-level block diagram of a computing environment for performing adaptive column set composition, in accordance with an embodiment of the invention. The computing environment includes at least one data producer 110, a plurality of data consumers 120, and a column set server 130. It is noted that in some implementations, the data producer 110, the data consumers 120, and the column set server 130, or a subset of some of them, are owned or controlled by the same entity, or may even be parts of the same system. However, when the data producer 110 and the data consumers 120 are owned or controlled by different entities, the communication between the data producer 110 and the data consumers 120 through the column set server 130 is especially helpful to improve efficiency, as will be described below.

Each data producer 110 produces at least one data table having a plurality of columns. Each data producer 110 is associated with a unique producer identifier and each data table produced by a data producer 110 is associated with a unique table identifier. For example, the table identifier may be a text string followed by a time stamp indicating the time of creation of the table. In one embodiment, the data producer communicates the producer identifier and the table identifier(s) to the column set server 130. In some cases, the table identifier may include the producer identifier, or the producer identifier may be omitted when only one data producer 110 is present in the system.

The data consumers 120 access data from tables produced by the data producers 110. Various data consumers 120 may only use subsets of the data contained in the tables they access. Two data consumers 120 may use the same columns of data from a table they access or different subsets of columns from the table they access. For example, the columns used by the data consumer 120 may be inferred from a query the data consumer 120 executes to request data from the table, for example by using an off-the-shelf tool to analyze what data the query is intended to access. In one implementation, each data consumer 120 communicates to the column set server 130 the table identifier and the columns used each time the data consumer 120 accesses a table. In other implementations, the data consumers 120 may report accesses less frequently to the column set server 130.

The column set server 130 receives the producer identifier and table identifier(s) from each data producer 110. The column set server 120 also receives notifications of the accesses to tables by the data consumers, the notifications including the columns of data used by each of the data consumers 120 and a table identifier. All of the information received by the column set server 130 can be stored in the column set server's data store 122. The decision module 124 of the column set server 120 analyzes accesses by data consumers 120 to each table stored in the data store 122 to determine an updated column set composition recommendation for future builds of tables to deliver to data producers 110 to reduce waste. The column set composition recommendation comprises a recommended partitioning of the columns of data. A data partition is a decomposition of the data schema in terms of how it is physically stored. Examples of a data partition include a file or a database table. For any given row, all the columns within a partition are preferably kept on the same physical storage medium. However, different rows could be kept on different devices regardless of the column partition composition, as is the case in striping, a common distributed data storage technique. In various embodiments of the invention, several techniques are used to determine an updated column set composition recommendation.

In one embodiment, the decision module 124 begins by analyzing whether conflicts exist between the columns used by the data consumers 120 that access a table. In the simplest case, no conflicts exist. If no conflicts exist because all data consumers 120 of a table use the same subset of columns, then the column set composition recommendation is the subset of columns used by the data consumers 120. If no conflicts exist because different data consumers 120 use non-overlapping subsets of columns from the same table, then the column set composition recommendation may be to split the table into at least two partitions, wherein one of the partitions will be used by one of the data consumers 120 and another partition will be used by another data consumer 120.

In the more complicated case, conflicts exist between the use patterns of various data consumers 120 to the same table. Conflicts exist where different data consumers 120 use overlapping but different subsets of columns from the same table. In these cases, the decision module 124 may determine a column set composition recommendation based on the amount of data wasted under various column set partitioning schemes as compared to the current table column set composition, weighted by the amount of accesses that the various data consumers 120 make to the data. Alternatively or additionally, weighting may be performed based on criteria such as the relative importance of various data consumers 120 or other criteria. The recommendation may also be based on limitations inherent in file systems if several different files need to be accessed to compile a larger set of columns. In order to avoid waste, the system could partition N columns into N sets of one column each. However, this can lead to performance loss for two reasons. First, splitting the columns too finely may reduce the effective I/O size well below the optimal I/O size for a given device. Section, reading from too many I/O devices at once can lead to delays when the amount of extra RAM buffer space needed exceeds capacity.

In the case of a relatively small number of columns for a table, many or all combinations of column set partitions may be analyzed to determine which column set composition is least wasteful. In some cases, the decision module 124 begins by analyzing the access patterns of the data consumer 120 that is the largest waster to use as a starting point for finding the efficient column set composition that results in the least waste. The amount of waste may be measured in terms of fields that are read and not used. Thus, the largest waster is the data consumer 120 that reads the most unused fields and the smallest waster is the data consumer 120 that reads the fewest unused fields. It is noted that the largest waster may or may not be the data consumer 120 that makes the most accesses to a table in a particular time period.

In some implementations, the decision module 124 may enforce thresholds on numbers of partitions to tables. For example, 5 partitions, or 3 partitions, or any other number of partitions may be enforced as a threshold based in part on limitations on the file systems associated with tables.

Once the decision module 124 of the column set server 130 determines an updated column set composition recommendation, the column set server 130 communicates the recommendation to the relevant data producer 110. Because the recommendation depends upon which data consumers 120 access the data in the table and the relative data set size ratios of the data consumers 120 that access the data, the recommendation may change when a new consumer process is added, when one is retired, or when relative data set size ratios change.

Figure 2:
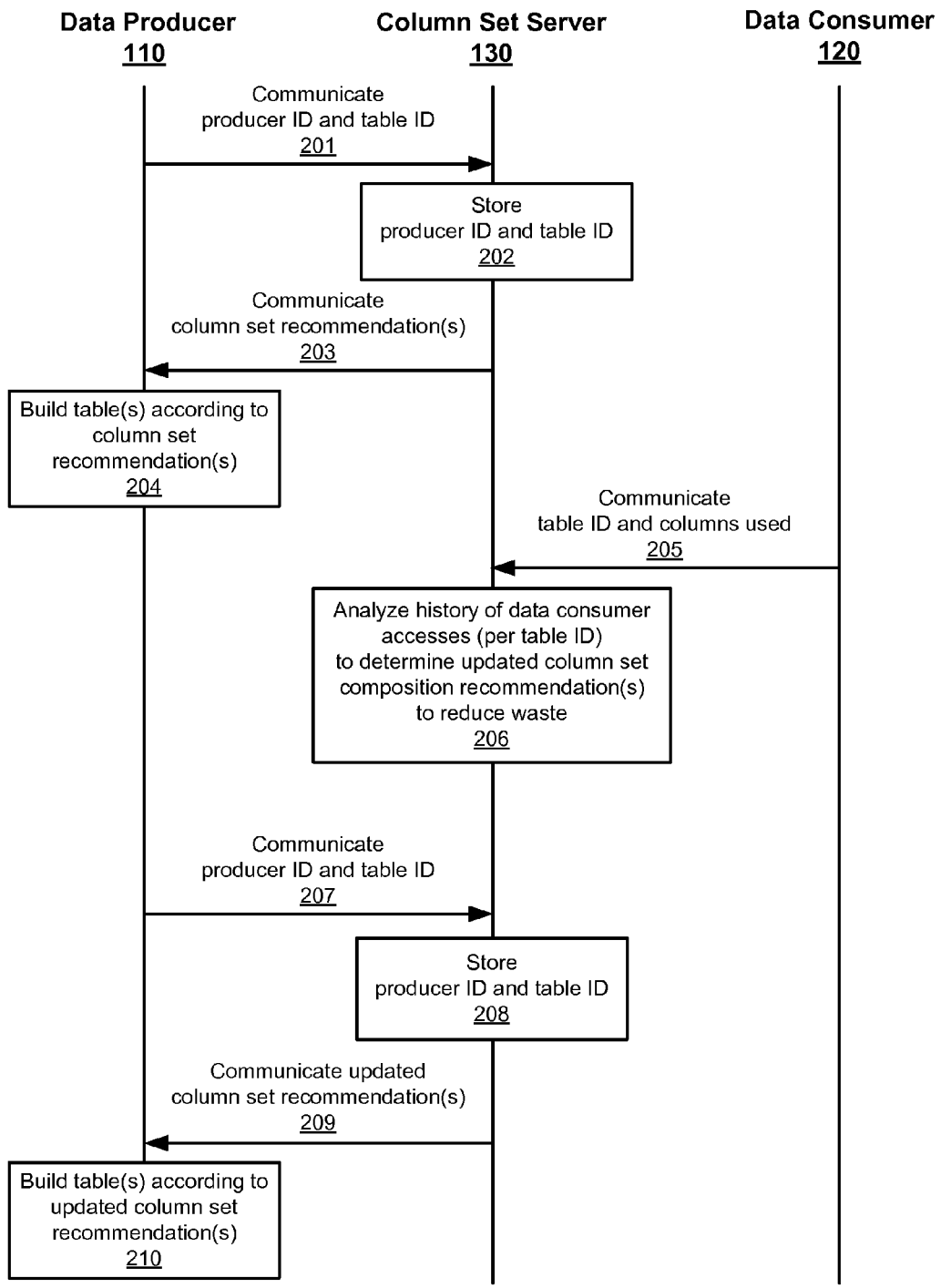
FIG. 2 is an interaction diagram illustrating adapting the column set composition, in accordance with an embodiment of the invention.

FIG. 2 is an interaction diagram illustrating adapting the column set composition of a table produced by a data producer 110, in accordance with an embodiment of the invention. In step 201, before the data producer 110 produces an instance of a table, the data producer 110 communicates the producer identifier and the table identifier to the column set server 130 to give the column set server 130 the opportunity to provide a set of column set recommendations for the building of the table. In step 202, the column set server 130 stores the producer identifier and the table identifier, for example in data store 122. In step 203, the column set server 130 communicates a column set recommendation, if any, to the data producer 110. If the table is a new table, it is likely that the column set server 130 does not yet have information on access patterns to the table by data consumers 120, and thus the recommendation may be a default recommendation, such as to keep all columns in one set, or alternatively, step 203 may be omitted.

In step 204, the data producer 110 builds an instance of a table or tables according to the column set recommendation(s) received from the column set server 130. In the case that no column set recommendation is provided in this iteration, the data producer 110 may fall back to producing an instance of a table according to a default column set composition (such as all columns in one set) or may follow a previous recommendation from the column set server 130.

After an instance of the table has been built in step 204, it is available to data consumers 120 to access. When a data consumer 120 accesses a table, in step 205, the data consumer communicates the table identifier associated with the table accessed and the columns used from that table to the column set server 130. Over time, this allows the column set server 130 to collect a history of accumulated data consumer accesses for each table identifier across all data consumers 130 that access the table.

In step 206, the history of data consumer accesses per table identifier is analyzed, for example by the decision module 134 of the column set server 130, to determine an updated column set composition recommendation to reduce waste. Any of the various methodologies described above with respect to the decision module 134 may be used to identify column set compositions that would reduce waste.

In step 207, before the data producer 110 builds the table again, the data producer 110 communicates the producer identifier and the table identifier to the column set server 130 which stores it in step 208. Then, in step 209, the column set server 130 can communicate the updated column set recommendation determined in step 206. In one embodiment, the column set recommendation may be in the format of identifying into how many sets the columns should be divided, and which columns should be in each set.

Subsequently, in step 210, the data producer 110 builds an instance of the table(s) according to the updated column set recommendations. Data consumers 120 access the most current instance of the table(s) with the updated column set(s) in the table(s), thus reducing the amount of waste experienced by the data consumers 120 in accessing the data.

Physical Components of a Computer

Figure 3:
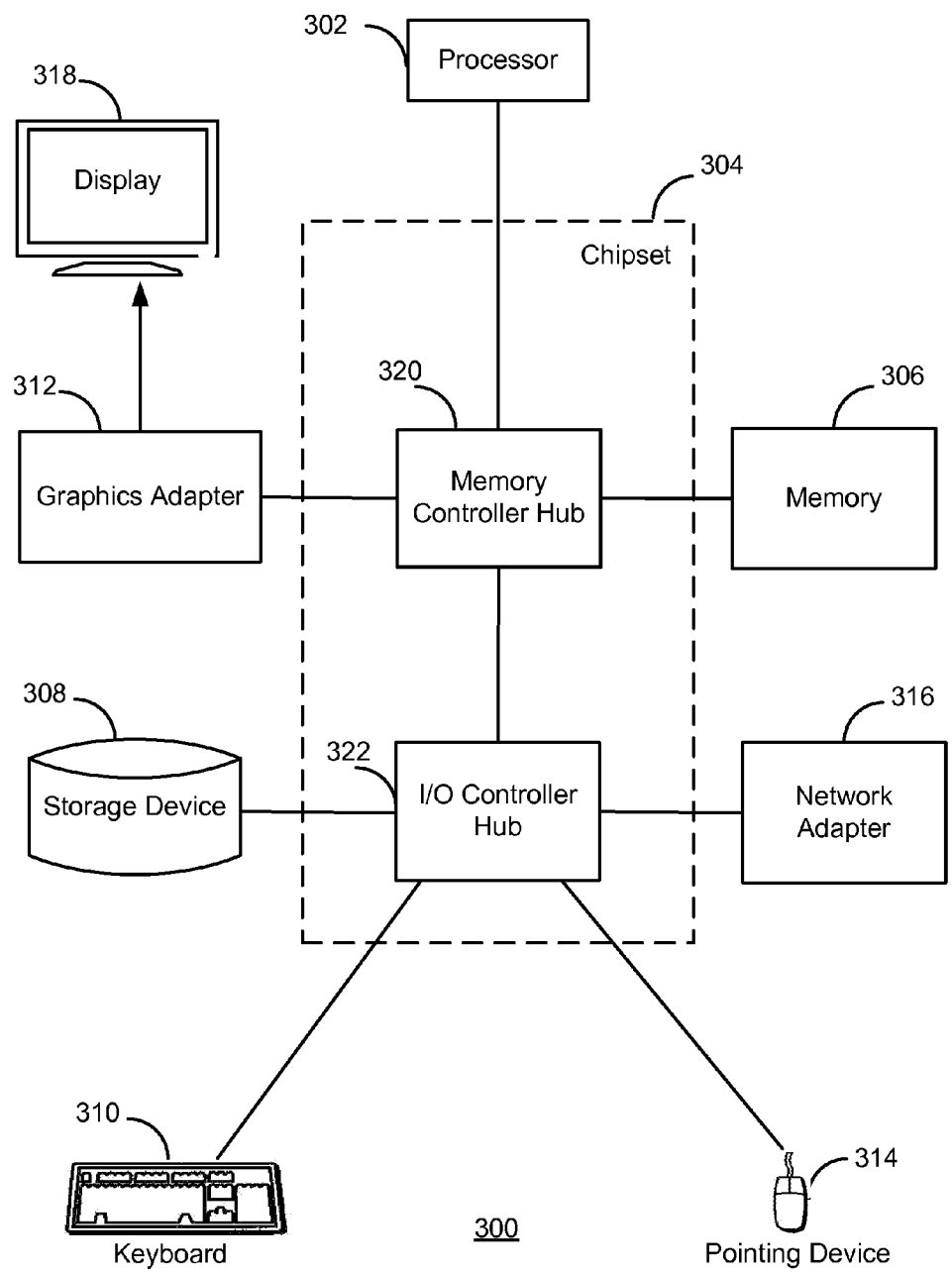
FIG. 3 is a high-level block diagram of the components of a computing system for use, for example, as the server or system depicted in FIG. 1, in accordance with an embodiment of the invention.

FIG. 3 is a high-level block diagram of the components of a computing system 300 for use, for example, as the server 120 depicted in FIG. 1, in accordance with an embodiment. Illustrated are at least one processor 302 coupled to a chipset 304. Also coupled to the chipset 304 are a memory 306, a storage device 308, a keyboard 310, a graphics adapter 312, a pointing device 314, and a network adapter 316. A display 318 is coupled to the graphics adapter 312. In one embodiment, the functionality of the chipset 304 is provided by a memory controller hub 320 and an I/O controller hub 322. In another embodiment, the memory 306 is coupled directly to the processor 302 instead of the chipset 304.

The storage device 308 is any non-transitory computer-readable storage medium, such as a hard drive, compact disk read-only memory (CD-ROM), DVD, or a solid-state memory device. The memory 306 holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to a network.

As is known in the art, a computer 300 can have different and/or other components than those shown in FIG. 3. In addition, the computer 300 can lack certain illustrated components. In one embodiment, a computer 300 acting as a server may lack a keyboard 310, pointing device 314, graphics adapter 312, and/or display 318. Moreover, the storage device 308 can be local and/or remote from the computer 300 (such as embodied within a storage area network (SAN)).

As is known in the art, the computer 300 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 308, loaded into the memory 306, and executed by the processor 302.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for performing incremental model training for targeting advertisements using streaming data. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer-implemented method of adapting a column set composition of a table produced by a data producer and used by a plurality of data consumers, the method comprising:

receiving notifications of a plurality of accesses to the table by the plurality of data consumers, the notifications including the columns of data of the table used by each of the data consumers, wherein at least two of the plurality of data consumers use overlapping but different subsets of columns of the table, and wherein the table is identified in the notifications by a table identifier;

analyzing by a column set server the plurality of accesses to determine an updated column set composition recommendation for the table, the analyzing comprising:

analyzing a plurality of combinations of column set partitions;

determining a total amount of waste for each of the plurality of combinations of column set partitions by determining, for a respective combination of column set partitions, an amount of data read from the table but not used by the respective data consumer for each access of the plurality of accesses to the table by the plurality of data consumers and performance losses due to a respective data consumer accessing multiple files;

selecting the combination of column set partitions having the lowest total amount of waste to be the updated column set composition recommendation;

communicating the updated column set composition recommendation for the table to the data producer for use in building the table for a next iteration; and responsive to a change in the notifications of a plurality of accesses to the table, repeating the receiving, the analyzing, and the communicating steps above to adapt the column set composition to the changed accesses to the table.

2. The method of claim 1, wherein analyzing the plurality of combinations of column set partitions comprises analyzing only combinations of column set partitions wherein the table is partitioned into five or fewer partitions.

3. The method of claim 1, wherein the updated column set composition recommendation comprises identification of into how many sets the columns should be divided and which columns should be in each set.

4. The method of claim 1, further comprising:

receiving notifications of a plurality of accesses to a plurality of other tables, and wherein the notifications of the accesses to the table and the notifications of accesses to the plurality of other tables each include a table identifier for the respective table.

5. The method of claim 1, wherein a plurality of data producers produce a plurality of tables, each data producer associated with a respective producer identifier, and wherein the table is identified in the notifications by the table identifier and the producer identifier associated with the data producer that produced the table.

6. A non-transitory computer readable storage medium executing computer program instructions for adapting a column set composition of a table produced by a data producer and used by a plurality of data consumers, the computer program instructions comprising instructions for:

receiving notifications of a plurality of accesses to the table by the plurality of data consumers, the notifications including the columns of data of the table used by each of the data consumers, wherein at least two of the plurality of data consumers use overlapping but different subsets of columns of the table, and wherein the table is identified in the notifications by a table identifier;

analyzing the plurality of accesses to determine an updated column set composition recommendation for the table, the analyzing comprising:

analyzing a plurality of combinations of column set partitions;

determining a total amount of waste for each of the plurality of combinations of column set partitions by determining, for a respective combination of column set partitions, an amount of data read from the table but not used by the respective data consumer for each access of the plurality of accesses to the table by the plurality of data consumers and performance losses due to a respective data consumer accessing multiple files;

selecting the combination of column set partitions having the lowest total amount of waste to be the updated column set composition recommendation;

communicating the updated column set composition recommendation for the table to the data producer for use in building the table for a next iteration; and responsive to a change in the notifications of a plurality of accesses to the table, repeating the receiving, the analyzing, and the communicating steps above to adapt the column set composition to the changed accesses to the table.

7. The storage medium of claim 6, wherein the instructions for analyzing the plurality of combinations of column set partitions comprise instructions for analyzing only combinations of column set partitions wherein the table is partitioned into five or fewer partitions.

8. The storage medium of claim 6, wherein the updated column set composition recommendation comprises identification of into how many sets the columns should be divided and which columns should be in each set.

9. The storage medium of claim 6, further comprising instructions for:

receiving notifications of a plurality of accesses to a plurality of other tables, and wherein the notifications of the accesses to the table and the notifications of accesses to the plurality of other tables each include a table identifier for the respective table.

10. The storage medium of claim 6, wherein a plurality of data producers produce a plurality of tables, each data producer associated with a respective producer identifier, and wherein the table is identified in the notifications by the table identifier and the producer identifier associated with the data producer that produced the table.

11. A system comprising:

a computer processor;

a non-transitory computer readable storage medium storing processor-executable computer program instructions for adapting a column set composition of a table produced by a data producer and used by a plurality of data consumers, the instructions comprising instructions for:

receiving notifications of a plurality of accesses to the table by the plurality of data consumers, the notifications including the columns of data of the table used by each of the data consumers, wherein at least two of the plurality of data consumers use overlapping but different subsets of columns of the table, and wherein the table is identified in the notifications by a table identifier;

analyzing the plurality of accesses to determine an updated column set composition recommendation for the table, the analyzing comprising:

analyzing a plurality of combinations of column set partitions;

determining a total amount of waste for each of the plurality of combinations of column set partitions by determining, for a respective combination of column set partitions, an amount of data read from the table but not used by the respective data consumer for each access of the plurality of accesses to the table by the plurality of data consumers and performance losses due to a respective data consumer accessing multiple files;

selecting the combination of column set partitions having the lowest total amount of waste to be the updated column set composition recommendation;

communicating the updated column set composition recommendation for the table to the data producer for use in building the table for a next iteration; and responsive to a change in the notifications of a plurality of accesses to the table, repeating the receiving, the analyzing, and the communicating steps above to adapt the column set composition to the changed accesses to the table.

12. The system of claim 11, wherein the instructions for analyzing the plurality of combinations of column set partitions comprise instructions for analyzing only combinations of column set partitions wherein the table is partitioned into five or fewer partitions.

13. The system of claim 11, wherein the updated column set composition recommendation comprises identification of into how many sets the columns should be divided and which columns should be in each set.

14. The system of claim 11, wherein the instructions further comprise instructions for:

receiving notifications of a plurality of accesses to a plurality of other tables, and wherein the notifications of the accesses to the table and the notifications of accesses to the plurality of other tables each include a table identifier for the respective table.

15. The system of claim 11, wherein a plurality of data producers produce a plurality of tables, each data producer associated with a respective producer identifier, and wherein the table is identified in the notifications by the table identifier and the producer identifier associated with the data producer that produced the table.

\* \* \* \* \*